Oct. 6, 1964
H. A. LEATH
3,151,529
MOTOR
Filed May 22, 1962
5 Sheets-Sheet 5
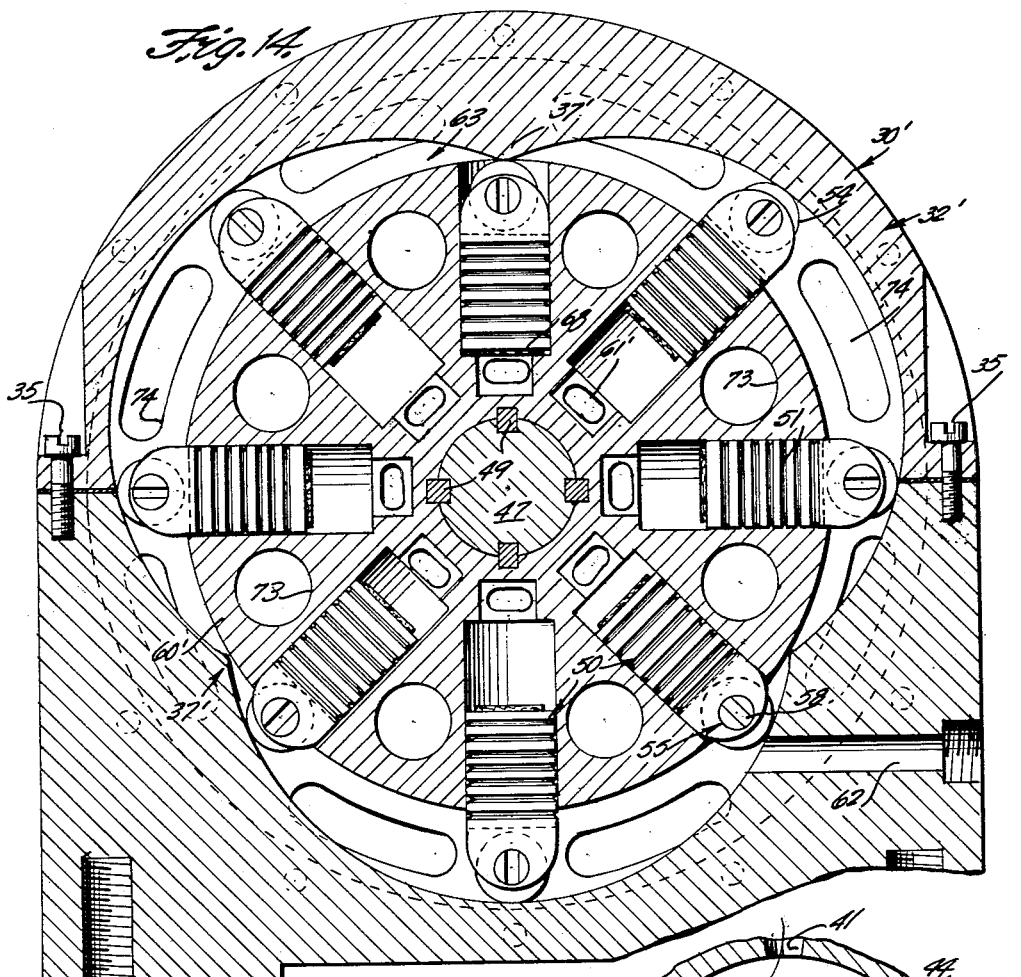
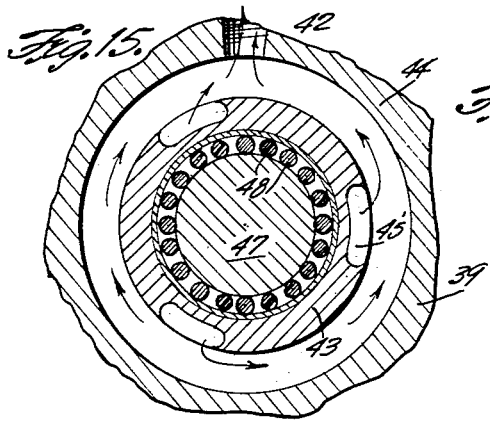
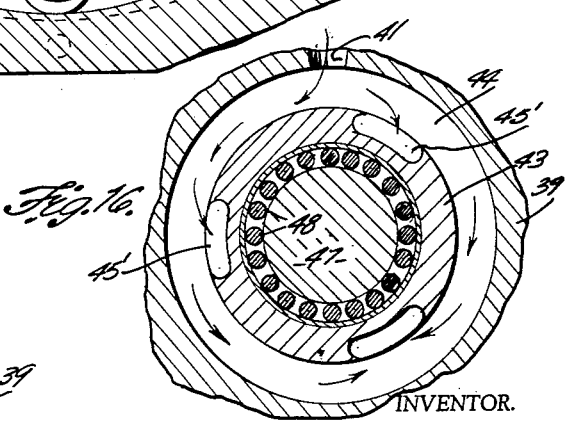
INVENTOR.
HARRY A. LEATH,
BY Victor J. Evans & Co.
Attorneys

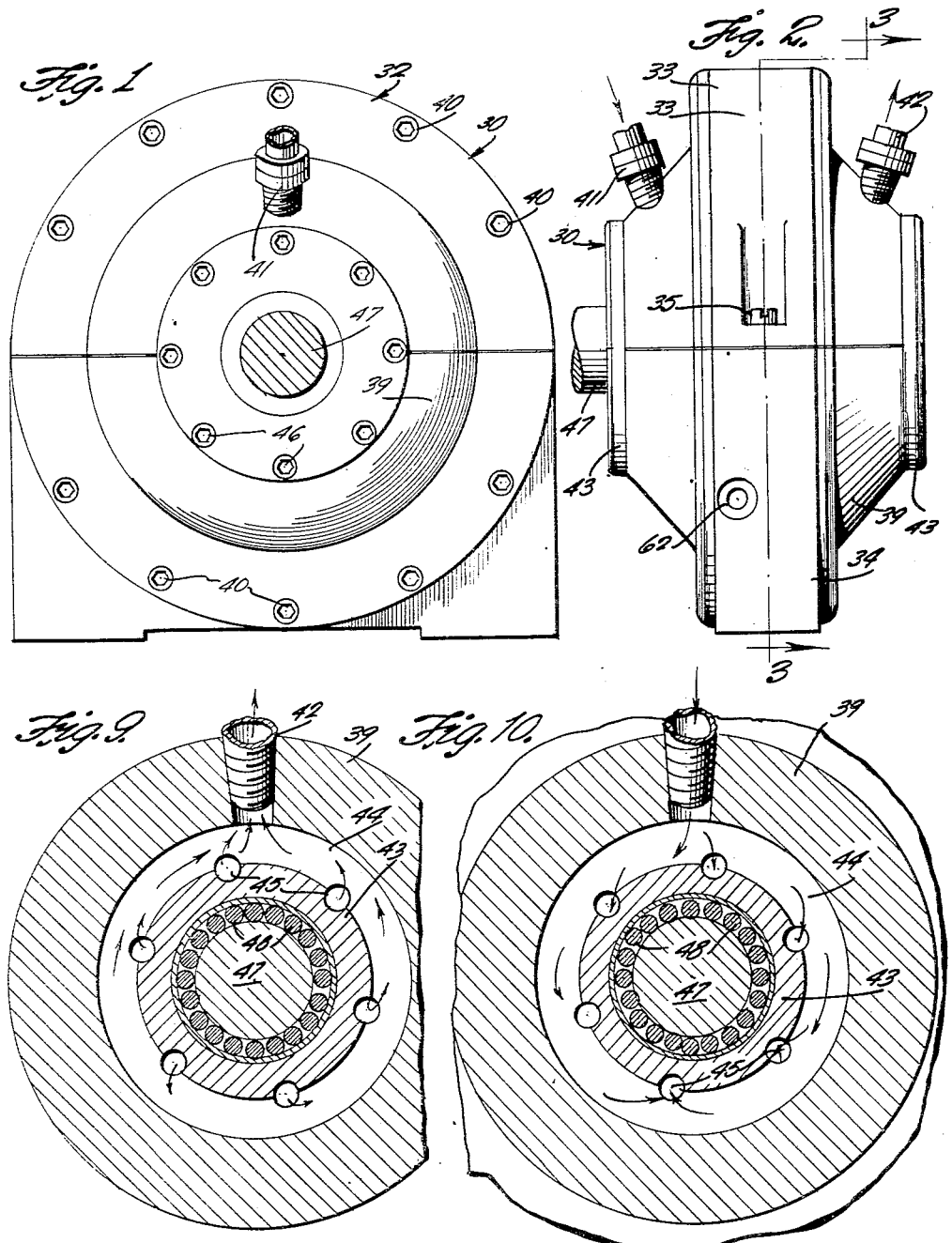

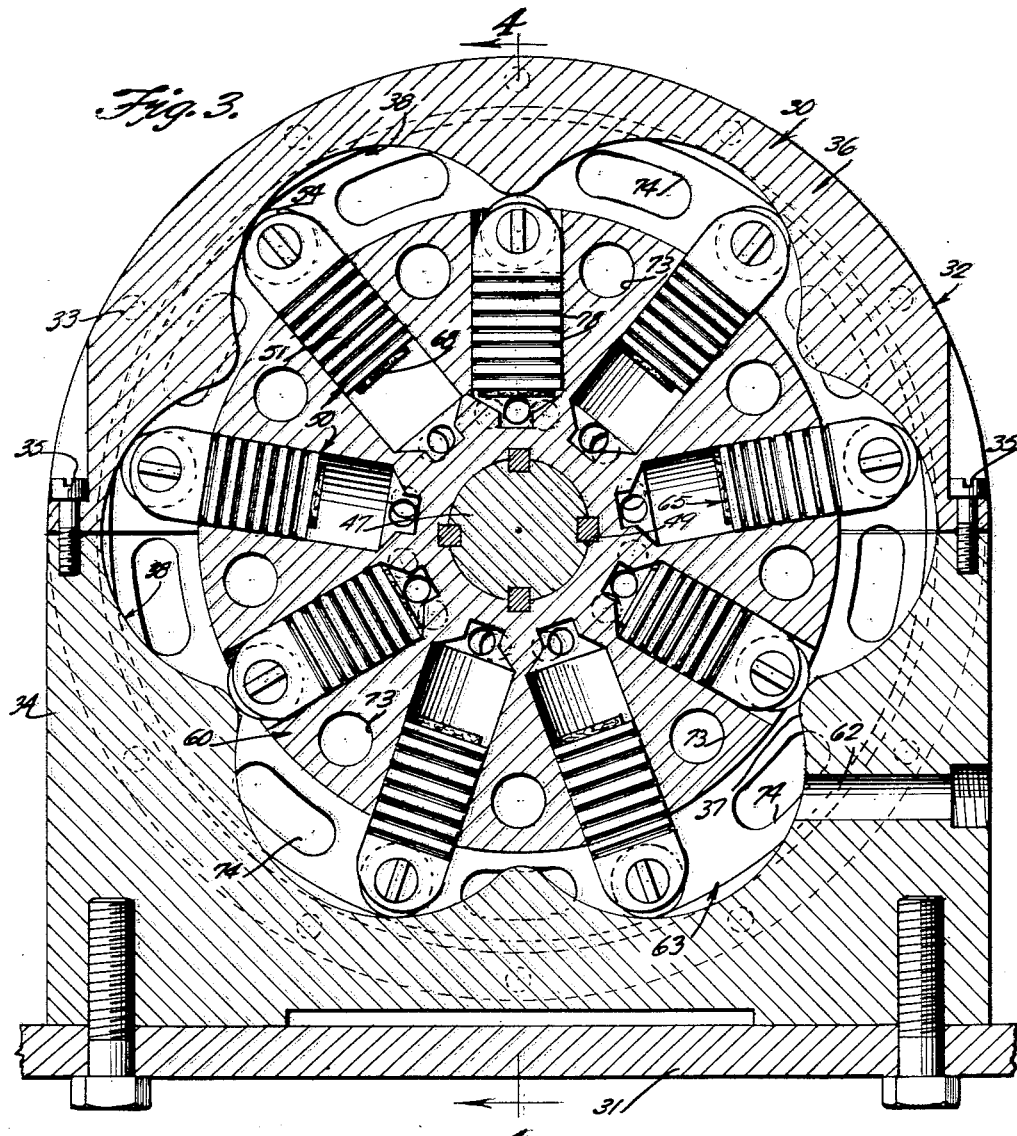
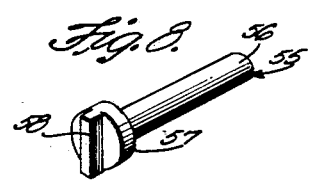

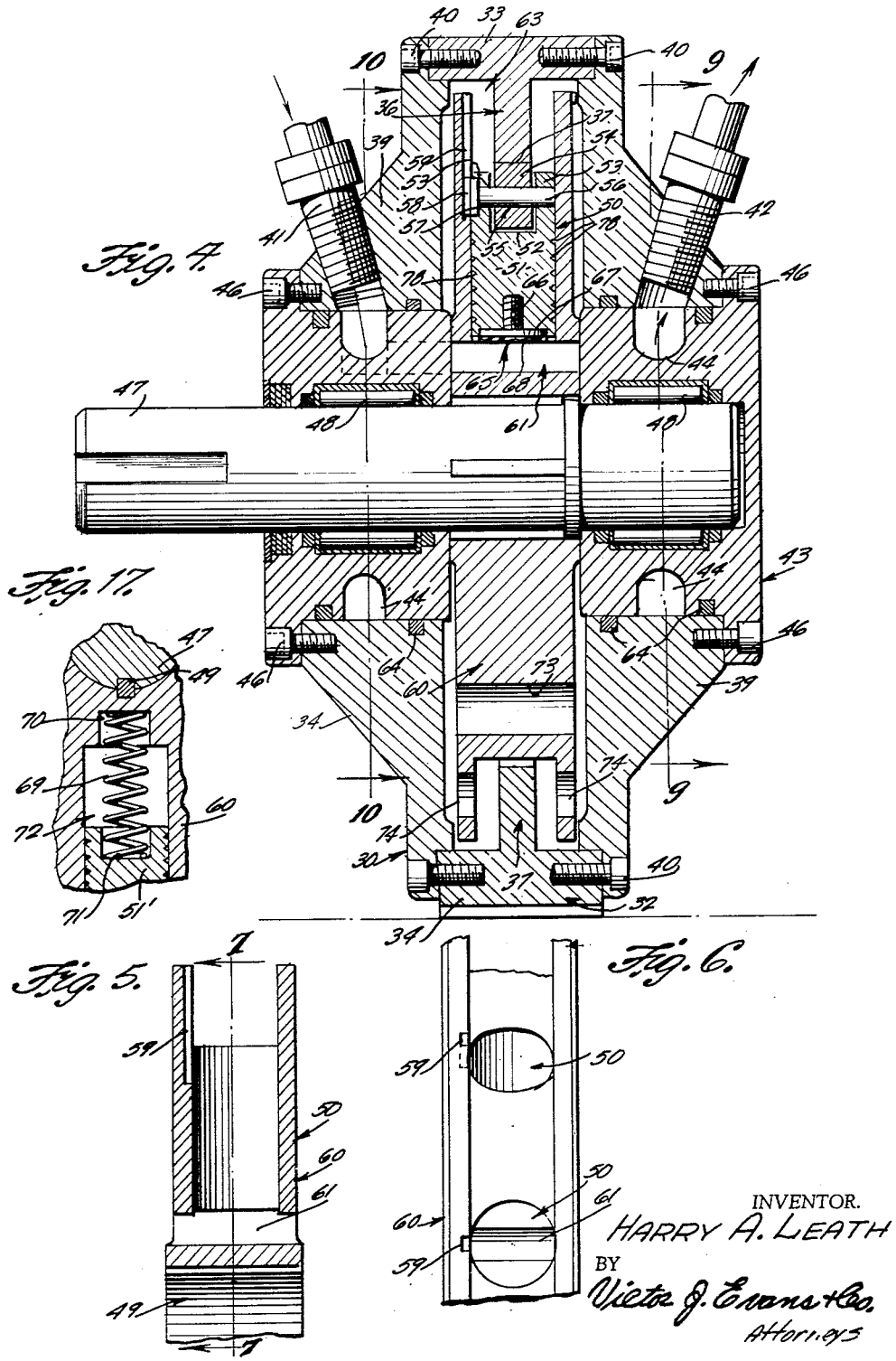

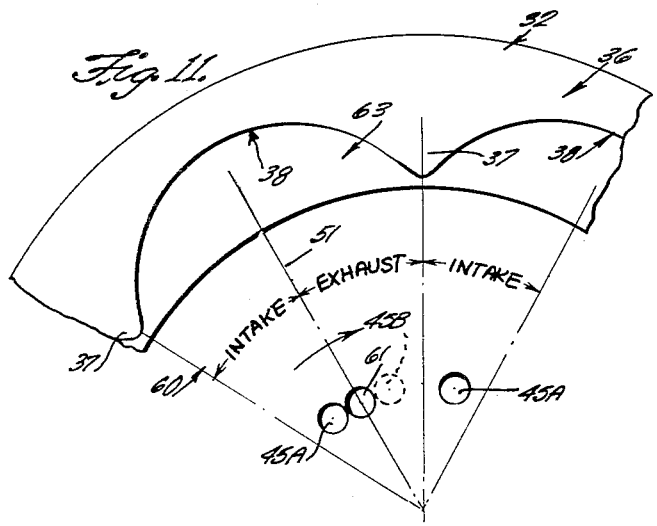
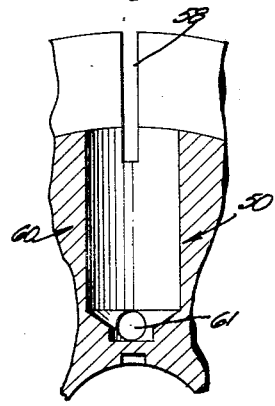
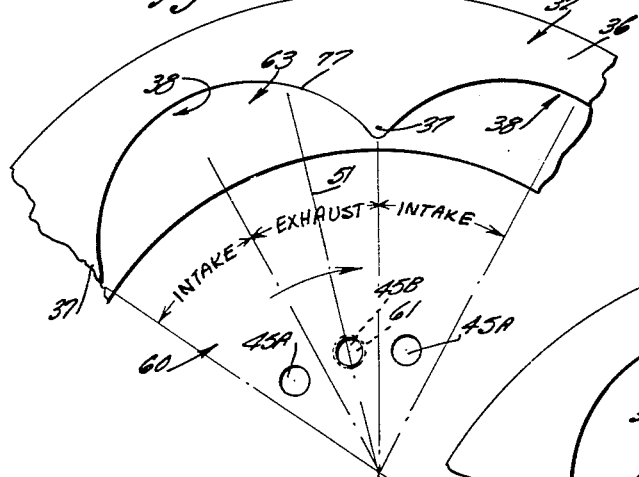
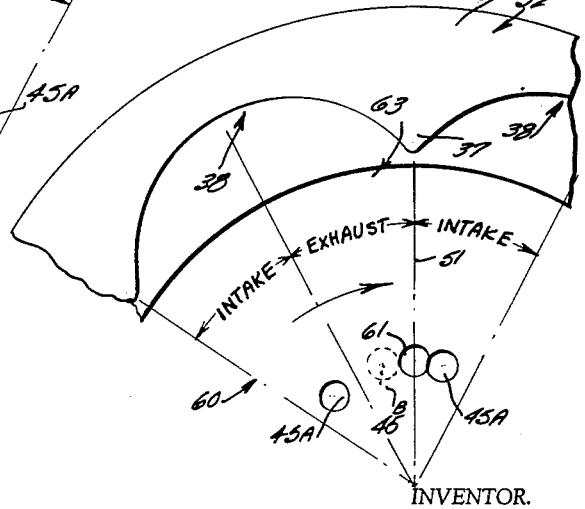

United States Patent Office 3,151,529
Patented Oct. 6, 1964

3,151,529
MOTOR
Harry A. Leath, 21932 Standing Rock Road,
Apple Valley, Calif.
Filed May 22, 1962, Ser. No. 196,683
7 Claims. (Cl. 91—205)

This invention relates to a motor, and more particularly to a fluid actuated or operated motor.

The object of the invention is to provide a motor that is adapted to be operated or driven by a suitable medium such as hydraulic fluid, air under pressure or the like, and wherein the motor is adapted to be used for rotating a shaft that can be used for any desired or required purpose.

Another object of the invention is to provide a motor for utilizing a fluid under pressure such as hydraulic fluid, compressed air or the like and wherein the motor can be operated at different speeds in either a clockwise or counter-clockwise direction, and wherein the torque or thrust is proportional to the pressure under which the fluid or gas is introduced into the motor, and wherein the motor is constructed so that friction loss will be kept to a minimum, and wherein fluid leakage will also be minimized or prevented.

A still further object of the invention is to provide a motor which includes a plurality of spaced apart cams, and wherein the number of such cams as well as the number of pistons and rollers that cooperate with the cams can be varied as desired or required depending upon the speed requirments or torque requirements, as for example in order to adapt the motor to a required work load, and wherein according to the present invention fluids or gases are supplied from a suitable pump or the like so that this actuating medium will move under pressure into a common circular manifold which has outlet ports that are spaced to time the transfer into the rotor as it progresses or rotates to the cam, the motor of the present invention including a cam chamber that is substantially dry and wherein the cam chamber is not pressurized since the pressurized area is confined to the inner end portions of the piston bores.

Still another object is to provide such a motor that is economical to manufacture and operate, and which is efficient in operation and which is rugged in structure and fool proof in use.

These and other objects of the invention will become apparent from a reading of the following specification and claims, together with the accompanying drawings, wherein like parts are referred to and indicated by like reference characters and wherein:

FIGURE 1 is an elevational view of the motor of the present invention, and showing the shaft in section.

FIGURE 2 is a view taken at right angles to the view shown in FIGURE 1.

FIGURE 3 is an enlarged sectional view taken on the line 3—3 of FIGURE 2.

FIGURE 4 is a sectional view taken on the line 4—4 of FIGURE 3.

FIGURE 5 is a fragmentary sectional view taken through the rotor.

FIGURE 6 is a plan view of the portion of the rotor shown in FIGURE 5.

FIGURE 7 is a sectional view taken on the line 7—7 of FIGURE 5.

FIGURE 8 is a perspective view of one of the pins for connecting a roller to a piston.

FIGURE 9 is a sectional view taken on the line 9—9 of FIGURE 4.

FIGURE 10 is a sectional view taken on the line 10—10 of FIGURE 4.

FIGURES 11, 12 and 13 are diagrammatic views showing the different positions of the rotor as for example during intake and exhaust.

FIGURE 14 is a fragmentary sectional view generally similar to FIGURE 3 but illustrating a modification wherein a lesser number of pistons and cams and associated parts are used.

FIGURE 15 is a fragmentary sectional view generally similar to FIGURE 9, but showing the exhaust mechanism for the modification of FIGURE 14.

FIGURE 16 is a fragmentary sectional view generally similar to FIGURE 10, but showing the intake mechanism for the modification of FIGURE 14.

FIGURE 17 is a fragmentary sectional view of another modification.

Referring in detail to the drawings, and more particularly to FIGURES 1 through 13 of the drawings, the numeral 30 indicates a motor that may be mounted on a base 31, and as shown in the drawings the motor 30 comprises a body member that is indicated generally by the numeral 32. The body member 32 consists of upper and lower sections 33 and 34 which are adapted to be joined together as at 35, and the body member 32 provides a ring member which is indicated generally by the numeral 36. The ring member 36 is provided with a plurality of spaced apart inwardly projecting cams 37, and there is provided arcuate recesses or recessed portions 38 between adjacent pairs of cams 37, FIGURE 3.

The motor 30 further comprises a pair of similar support members 39 which are arranged in spaced parallel relation with respect to each other, and the support members 39 are connected as at 40 to the body member 32, FIGURE 4. Fluid inlet and outlet conduits or fittings 41 and 42 are connected to the support members 39 as shown in the drawings.

There is further provided a pair of similar hub elements 43, and each of the hub elements 43 is provided with an annular groove 44 that defines a manifold. A plurality of spaced apart ports or openings 45 communicate with the manifold 44 for a purpose to be later described. The hub elements 43 are connected as at 46 to the support members 39.

The numeral 47 indicates a shaft which is rotatably arranged in the hub elements 43, and suitable bearings 48 are arranged as shown in FIGURE 4. The numeral 60 indicates a rotor which is rotatably mounted between the support members 39, and as shown in the drawings the rotor 60 is keyed as at 49 to the shaft 47. The rotor 60 is provided with a plurality of spaced apart radially disposed bores 50, and a piston or plunger 51 is slidably or reciprocally arranged in each bore 50. As shown in FIGURE 4 for example, the outer portion of each piston 51 is bifurcated or cut away so as to provide a slot 52 which defines in the outer end portion of the piston spaced apart flanges 53, and a roller 54 is positioned in the slot 52 between each pair of flanges 53. A pin 55, FIGURE 8, is provided for connecting the roller 54 to the flanged portion 53 of the piston, and as shown in FIGURE 8 the pin 55 includes a shank 56 as well as an enlarged head 57, and the head 57 is provided with a ridge or lug 58 that is adapted to slide in a groove 59 in the adjacent portion of the rotor 60.

There is provided in the inner central portion of the rotor 60 a plurality of spaced apart openings or passageways 61, and these passageways 61 communicate with the inner portions of the bores 50, and as the rotor 60 turns or rotates, the passageways 61 are adapted to move into and out of registering or alignment with the ports 45, for a purpose to be later described.

The rollers 54 are adapted to selectively engage the cams 37 and recessed portions 38 during rotation of the rotor.

The numeral 62 indicates a breather opening which establishes communication between the atmosphere and a chamber 63 which is defined within the motor.

The numeral 64 indicates packing or sealing elements that are adapted to be used for minimizing or preventing leakage of fluid such as hydraulic actuating fluid, compressed air, gas under pressure or the like.

There is further provided a cushioning means for the inner ends of the pistons, and this cushioning means is indicated generally by the numeral 65 and comprises a fastener or securing element 66 which is connected to the inner end of each piston 51, and the fastener 66 is provided with an integral support portion 67 that has a resilient or yieldable bumper 68 secured thereto.

Referring to FIGURE 17 of the drawings, there is illustrated a modified cushioning means which is indicated generally by the numeral 72, and this cushioning means 72 comprises a coil spring 69 which has one end engaging a recess or cut away portion 70 in the rotor 60, and the other end of the coil spring 69 is adapted to engage a recess 71 in the piston 51′.

The rotor 60 is provided with a plurality of spaced apart cutouts or openings 73, and there is also provided other openings or cutouts 74, and these openings 73 and 74 function or serve to insure that the motor will be of a minimum weight since the openings 73 and 74 are a means of dispensing with certain of the material that is used for fabricating similar parts.

Referring now to FIGURES 14, 15 and 16 of the drawings, there is illustrated a modified motor which is indicated generally by the numeral 30′, and the motor 30′ is adapted to operate and have the same general construction as the previously described motor 30. However, the motor 30′ is shown to include a lesser number of parts as for example in FIGURE 14 there is illustrated eight cylinders or pistons 51, as compared to the nine pistons 51 provided for the motor 30 of FIGURE 3. Also, in FIGURE 14 the body member 32′ has three cams, as compared to the six cams 37 of FIGURE 3. For each revolution of the rotor 60 of FIGURE 3 there will be fifty-four impulses, while the motor 30′ of FIGURE 14 will provide twenty-four impulses for each revolution of the rotor 60. In the motor 30′, the ports 61′ are adapted to have a generally elongated or non-circular formation, while in the motor illustrated in FIGURES 1 through 13, these ports as indicated by the numeral 61 are of generally circular formation in cross section.

In the modification of FIGURES 14, 15 and 16, the passageways 61′ in the rotor 60′ are non-circular, and similarly the ports 45′ in the hub elements 43 are non-circular to conform to the shape of the passageways 61′.

From the foregoing, it is apparent there has been provided a motor, and the motor is adapted to be operated as for example by means of hydraulic fluid under pressure, air under pressure, or a suitable gaseous medium or the like. With the parts arranged as shown in the drawings, and particularly as shown in FIGURES 1 through 13 of the drawings, it will be seen that the actuating medium such as hydraulic fluid or air under pressure is adapted to be supplied or pumped from a suitable source of supply into the fitting or conduit 41, and this fluid will flow from the fitting 41 into the manifold groove 44 in the adjacent hub element 43. This fluid will then flow from the groove 44 through the ports 45 in the hub element 43 shown in the left side of FIGURE 4 for example, and this fluid will then enter those passageways 61 which are in registry or alignment with the ports 45. This fluid which enters the passageways 61 will flow into the bores 50 so as to force or move the pistons 51 outwardly in the bores 50, and as the pistons 51 move outwardly in the bores 50, they will cause the rollers 54 to engage the cams 37 or recessed surfaces 38, and since the body member 32 is stationary, it will be seen that this engagement of the rollers 54 with the cams 37 and recesses 38 will cause the rotor 60 to turn. As the rotor 60 rotates or turns, the rollers 54 will move into and out of engagement with the recesses 38 and cams 37 so that for example when the rollers 54 are in engagement with the cams 37 the pistons 51 will be pushed inwardly into the bores 50 so as to expell the actuating fluid from the bores out through the passageways 61 and into the ports 45 such as the ports 45 in the hub element 43 shown in the right of FIGURE 4, and from these ports 45 the actuating fluid will enter the manifold groove 44 shown in the right side of FIGURE 4, and from this manifold groove 44 the actuating fluid will flow out through the fitting 42 and this actuating fluid can be returned to a reservoir tank or the like so that the fluid can be used over and over again.

It is to be noted that the shaft 47 is keyed as at 49 to the rotor 60 so that as the roor 60 turns the shaft 47 will likewise turn, and this shaft 47 can be suitably coupled or connected to any desired type of load whereby the rotation of the shaft 47 can be used for any desired or required purpose.

Attention is now directed to FIGURES 11, 12, and 13 of the drawings wherein there is illustrated schematically or diagrammatically the operation of the present invention. It is to be noted that the ports in one hub element 43 are arranged in staggered relation with respect to the ports in the opposite hub element so that the ports in the opposed hub elements are not in alignment or registry with each other. This is illustrated diagrammatically in FIGURES 11, 12 and 13 wherein for example 45A indicates inlet ports such as the inlet ports that have previously been referred to as the ports 45 in the left hub element 43 shown in FIGURE 4. Similarly, the exhaust or outlet ports in FIGURES 11, 12 and 13 are indicated by 45B, and these ports 45B correspond to the ports in the hub element 43 shown in the right of FIGURE 4. In FIGURES 11, 12 and 13 the heavy broken line indicated by the numeral 51 represents the position of the piston as the rotor 60 rotates, and for example as shown in FIGURE 11 the piston 51 is in the center of a recess 63 so that the passageway 61 is between an inlet port 45A and an exhaust port 45B wherein with the parts arranged as shown in FIGURE 11 the piston is at the top of the stroke ready to exhaust, and wherein in FIGURES 11, 12 and 13 the rotor 60 is adapted to turn in a clockwise direction.

Referring now to FIGURE 12 of the drawings, there is illustrated a next position as for example when the piston 51 moves from the position of FIGURE 11 to the position of FIGURE 12, and in FIGURE 12 the passageway 61 is in alignment with the exhaust 45B so that hydraulic fluid in the bore will be forced out through the passageway 61 and into the exhaust port 45B due to the fact that the roller of the piston 51 is engaging the curved or arcuate surface 77 which causes the piston to be pushed inwardly to force the actuating fluid out into the exhaust port. FIGURE 12 shows the piston diagrammatically in a position so that its passageway 61 is on full exhaust.

In FIGURE 13 there is illustrated diagrammatically a different position wherein the piston 51 is arranged in alignment with the cam or high point 37 so that the piston is at the bottom of the stroke ready to take in fluid from the intake port 45A.

FIGURE 11 shows the piston in registry or alignment with a low point between the cams 37, so that the passageway 61 is arranged between the intake and exhaust ports whereby the passageway 61 will be closed or shut off when the parts are in the position of FIGURE 11. Continued rotation of the rotor 60 as for example from the position shown in FIGURE 11 to the position shown in FIGURE 12 causes the exhaust port 45B to start to open so that fluid can exhaust out through the port 45B. As shown in FIGURE 13, the piston 51 is at the high point or cam 37 so that the intake and exhaust ports are both closed off, and FIGURE 13 is at a position just prior to opening of the intake port. In other words the intake and exhaust ports are all closed off when the piston is at the low point as for example as shown in FIGURE 11, and also when the piston is at the high point as shown in FIGURE 13, but when the piston is at an intermediate position as for example as shown in FIGURE 12, the ports are opened for the entrance or exhausting of the actuating fluid. This action is brought about due to the fact that the inlet ports are offset or staggered with respect to the exhaust ports, so that for example with the parts arranged as shown in FIGURE 4 the ports 45 in the left hub element 43 are not in alignment or are not in registry with the ports 45 shown in the right hand hub element 43.

In the modification of FIGURES 14, 15 and 16, there is shown a motor 30' which includes a body member 32' that has only three cams 37', instead of the six cams 37 illustrated in FIGURE 3. Similarly in FIGURE 14 there are eight cylinders so that for each revolution of the rotor, twenty-four impulses will be given to the shaft 47 instead of the fifty-four impulses produced by the arrangement shown in FIGURE 3. The twenty-four impulses result from the arrangement of FIGURE 14 because the three cams 37' will act on the eight pistons to produce the twenty-four impulses for each revolution of the rotor. In FIGURE 3 the six cams 37 will act on the nine pistons 51 to produce fifty-four impulses on the shaft 47 for each revolution of the rotor 60.

It is to be noted that in the modification of FIGURES 14, 15 and 16, the inlet and exhaust ports as indicated by the numeral 45' are non-circular, and similarly passageways 61' in the rotor 60' are non-circular so that these ports and passageways have a generally elongated formation in order to provide the necessary opening and closing of the ports and passageways can take place as the rotor 60' turns. Thus, since there are fewer pistons and associated parts in the arrangement of FIGURES 14, 15 and 16, as compared to the motor of FIGURES 1 through 13, the ports and passageways have a generally widened configuration in order to permit the necessary opening and closing action to take place.

The pistons are adapted to be provided with indentations or small channels or grooves 78 which are adapted to be used as oil or lubrication carrying grooves in order to permit the pistons to move in their respective bores with the least amount of friction.

The parts can be made of any suitable material and in different shapes or sizes.

The rollers 54 are connected to the pistons 51 by means of the pins 55 and each pin 55 is provided with a ridge 58 on its head 57, and the ridge 58 is slidably positioned in the adjacent slot 59. This construction permits the roller and piston to move in or out but nevertheless prevents the piston from rotating or turning in its bore and this is necessary because the rollers 54 must be kept in alignment with the cams 37 and recesses 38. Without the pins 55, for example, the pistons 51 might turn or rotate in their bores so that the rollers 54 could move out of their proper aligned position relative to the cams and recesses.

It will be seen that according to the present invention there has been provided a motor for translating fluid under pressure, compressed air, gases or the like into work energy and wherein the present invention can be operated or made as a high torque low r.p.m. motor so that the r.p.m. or speed of the motor is governed by the gallons per minute forced into the motor. The range of speed can vary as for example from 1 r.p.m. to 50 r.p.m. while developing high torque and 360 degree rotation in either a clockwise or counter-clockwise direction. That is, instead of using the fitting or conduit 41 as an inlet, the fitting 42 can be used as an inlet and the fitting 41 can be used as an outlet, if desired or required.

The torque or thrust is in proportion to the pressure square inch under which the fluid or gases are introduced into the motor and also are proportional to the area of the piston which is exposed to pressure simultaneously times the distance from the center line to the tip or loop of the cam. The construction shown in FIGURE 3 is such that three pistons are simultaneously utilized or energized, and the amount of torque that is produced is reduced by the amount of friction loss throughout the motor, and this friction loss is held to a minimum as for example by placing the rollers in the pistons which follow the cams and furthermore this friction is reduced by eliminating mechanical seals from the pistons. Also, the small V-shaped grooves or channels 78 are provided on the pistons to keep the cylinder walls lubricated and at the same time reduce leakage.

Another important aspect of the present invention is that the number of high points or cam surfaces 37 or 37' can vary, and the number of pistons in the rotor can vary according to speed requirements or torque requirements relative to a particular work load.

In addition, according to the present invention fluid or gases are transferred from a pump or the like which moves the fluid or gas under pressure into a common circular manifold that has the several outlets or ports spaced to time the transfer into the rotor as it progresses rotatably to the cam. The inner portions of the bores are pressurized so as to force the rollers on the pistons down one portion or one half of a recess 38 and then on the opposite side, the pressure is exhausted into another manifold while the second half of the recess forces the piston back to its original position. Hence, on a nine cylinder rotor and a six loop cam, there will be fifty-four impulses per revolution of the rotor, or eighteen impulses per revolution and wherein there will be simultaneously energized three pistons that are spaced 120 degrees apart at all times.

The pins 55 prevent the pistons from oscillating or rotating within the bores so as to keep the rollers properly aligned with the cams.

Also, in the present invention the cams chamber as indicated generally by the numeral 63 is a dry chamber except for a small leakage that may occur, and this area or chamber 63 is not pressurized. In the present invention the pressurized area is confined to the inner portions of the piston bores 50.

The mechanism 65 includes the resilient element 68 which is of a non-metallic substance so that it provides a cushion or bumper to eliminate noise when the piston strikes the bottom of the bore on the exhaust stroke. Or, as shown in FIGURE 17 instead of using the mechanism 65, the coil spring 69 is adapted to be used adjacent the inner end of each piston and this coil spring 69 serves the same general purpose as the mechanism 65, that is, it functions to help eliminate noise on the inward stroke or movement of the piston.

Minor changes in shape, size and rearrangement of details coming within the field of invention claimed may be resorted to in actual practice, if desired.

What is claimed is:

1. In a motor, a ring member provided with a plurality of inwardly projecting cams arranged in spaced apart relation with respect to each other, there being arcuate recessed portions between said cams, support members affixed to said ring member, inlet and outlet fittings connected to said support members, hub elements mounted in said support members and said hub elements being provided with annular grooves which communicate with said fittings, there being a plurality of spaced apart ports in said hub elements communicating with said grooves, a unitary rotor having a plurality of transverse cutouts therein rotatably mounted between said pair of support members, a shaft rotatably arranged in said hub elements and said shaft being keyed to said rotor, said rotor being provided with a plurality of radially disposed bores, pistons reciprocally arranged in said bores, rollers connected to the outer portions of said pistons for engaging said cams and recessed portions, there being a plurality of spaced apart passageways in the inner portion of the rotor, said passageways communicating with said bores, and said passageways adapted to selectively register with said ports as the rotor turns.

2. In a motor, a ring member provided with a plurality of inwardly projecting cams arranged in spaced apart relation with respect to each other, there being arcuate recessed portions between said cams, support members affixed to said ring member, inlet and outlet fittings connected to said support members, hub elements mounted in said support members and said hub elements being provided with annular grooves which communicate with said fittings, there being a plurality of spaced apart ports in said hub elements communicating with said grooves, a unitary rotor having a plurality of transverse cutouts therein rotatably mounted between said pair of support members, a shaft rotatably arranged in said hub elements and said shaft being keyed to said rotor, said rotor being provided with a plurality of radially disposed bores, pistons reciprocally arranged in said bores, rollers connected to the outer portions of said pistons for engaging said cams and recessed portions, there being a plurality of spaced apart passageways in the inner portion of the rotor, said passageways communicating with said bores, and said passageways adapted to selectively register with said ports as the rotor turns, the ports in one of said hub elements being arranged in staggered offset relation with respect to the ports in the other hub element.

3. The structure as defined in claim 2 and further including pins connecting said rollers to said pistons, said pins being provided with ridges thereon, there being slots in said rotor for receiving said ridges.

4. The structure as defined in claim 2 and further including cushioning means on the inner portions of said pistons.

5. A motor comprising a stationary body member which comprises upper and lower sections joined together to provide a ring member, a plurality of equally spaced apart inwardly projecting cams on said ring member, there being arcuate recesses between said cams, a pair of similar support members affixed to said ring member, fluid inlet and outlet fittings connected to said support members, hub elements mounted in said support members, each of said hub elements being provided with an annular groove that communicates with an adjacent fitting in the support member, there being a plurality of spaced apart ports in each hub element and said ports communicating with said grooves, the ports in one hub element being arranged in staggered offset relation with respect to the ports in the other hub element, a shaft rotatably mounted in said hub elements, a unitary rotor having a plurality of transverse cutouts therein interposed between said pair of support members, said rotor being keyed to said shaft, said rotor being provided with a plurality of radially disposed spaced apart bores therein, pistons slidably mounted in said bores, rollers arranged contiguous to the outer ends of the pistons, and said rollers being arranged to selectively engage the recesses and cams of the ring member, means connecting said rollers to said pistons, there being a plurality of spaced apart passageways in the central portion of said rotor and said passageways communicating with said bores, and said passageways adapted to selectively register with said ports upon rotation of the rotor.

6. The structure as defined in claim 5 wherein the outer end portions of the pistons are bifurcated to provide spaced apart flanges thereon, said rollers being positioned between said flanges, pins extending through the flanges and rollers, and said pins each including an enlarged head provided with a ridge thereon, there being slots in said rotor for slidably receiving said ridges.

7. The structure as defined in claim 5 wherein a chamber is defined within said ring member adjacent the outer periphery of the rotor and wherein said chamber is free of actuating fluid and wherein said chamber is non-pressurized, there being a breather opening in said body member establishing communication between the chamber and atmosphere.

References Cited in the file of this patent
UNITED STATES PATENTS

| | | |
|---|---|---|
| 388,379 | Strait | Aug. 21, 1888 |
| 593,078 | Beyer | Nov. 2, 1897 |
| 3,046,950 | Smith | July 13, 1962 |

FOREIGN PATENTS

| | | |
|---|---|---|
| 864,767 | Great Britain | Apr. 6, 1961 |